(12) United States Patent
Zeng et al.

(10) Patent No.: US 12,550,197 B2
(45) Date of Patent: Feb. 10, 2026

(54) INFORMATION PROCESSING METHOD, DEVICE AND APPARATUS, AND COMPUTER-READABLE STORAGE MEDIUM

(71) Applicant: DATANG MOBILE COMMUNICATIONS EQUIPMENT CO., LTD., Beijing (CN)

(72) Inventors: Erlin Zeng, Beijing (CN); Li Chen, Beijing (CN); Yali Zhao, Beijing (CN)

(73) Assignee: DATANG MOBILE COMMUNICATIONS EQUIPMENT CO., LTD., Beijing (CN)

( * ) Notice: Subject to any disclaimer, the term of this patent is extended or adjusted under 35 U.S.C. 154(b) by 363 days.

(21) Appl. No.: 17/627,603

(22) PCT Filed: Jun. 2, 2020

(86) PCT No.: PCT/CN2020/093975
§ 371 (c)(1),
(2) Date: Jan. 14, 2022

(87) PCT Pub. No.: WO2021/017622
PCT Pub. Date: Feb. 4, 2021

(65) Prior Publication Data
US 2022/0322455 A1    Oct. 6, 2022

(30) Foreign Application Priority Data
Jul. 29, 2019  (CN) .......................... 201910690619.2

(51) Int. Cl.
*H04W 74/0833*  (2024.01)
*H04W 74/00*    (2009.01)
*H04W 80/02*    (2009.01)

(52) U.S. Cl.
CPC ..... *H04W 74/0841* (2013.01); *H04W 74/002* (2013.01); *H04W 80/02* (2013.01)

(58) Field of Classification Search
None
See application file for complete search history.

(56) References Cited

U.S. PATENT DOCUMENTS

| 9,215,731 B2 * | 12/2015 | Kitazoe ............... H04W 12/106 |
| 10,374,817 B2 * | 8/2019 | Yi .......................... H04W 76/40 |

(Continued)

FOREIGN PATENT DOCUMENTS

| CN | 102595636 A | 7/2012 |
| CN | 108282901 A | 7/2018 |

(Continued)

OTHER PUBLICATIONS

Extended European Search Report for European Patent Application 20849622.1 issued on Jul. 26, 2022.

(Continued)

*Primary Examiner* — San Htun
(74) *Attorney, Agent, or Firm* — Ladas & Parry, LLP

(57) ABSTRACT

The present disclosure provides an information processing method, an information processing device, an information processing apparatus and a computer-readable storage medium. The information processing method includes, in a random access procedure, transmitting a random access response message to a UE. The random access response message includes at least one MAC data sub-header, and the MAC data sub-header is used to indicate information about a response message and/or information about a data message included in the random access response message.

20 Claims, 8 Drawing Sheets

(56) References Cited

U.S. PATENT DOCUMENTS

| | | | | |
|---|---|---|---|---|
| 2009/0238141 | A1* | 9/2009 | Damnjanovic | H04W 36/18 370/331 |
| 2012/0051297 | A1* | 3/2012 | Lee | H04W 80/02 370/329 |
| 2012/0275378 | A1* | 11/2012 | Lee | H04W 74/08 370/328 |
| 2014/0334389 | A1* | 11/2014 | Abdel-Samad | H04W 74/004 370/328 |
| 2018/0270869 | A1* | 9/2018 | Tsai | H04W 76/27 |
| 2018/0279375 | A1* | 9/2018 | Jeon | H04W 72/23 |
| 2018/0288810 | A1* | 10/2018 | Ishii | H04W 72/23 |
| 2019/0335515 | A1* | 10/2019 | Chen | H04W 74/0858 |
| 2020/0178308 | A1* | 6/2020 | Chen | H04W 28/06 |
| 2020/0178318 | A1 | 6/2020 | Yu et al. | |

FOREIGN PATENT DOCUMENTS

| | | |
|---|---|---|
| CN | 108617004 A | 10/2018 |
| CN | 109152080 A | 1/2019 |
| CN | 109392187 A | 2/2019 |
| EP | 2640151 A1 | 9/2013 |

OTHER PUBLICATIONS

"Considerations on 2-Step RACH Procedures," 3GPP TSG RAN WG1 Meeting #96, R1-1901627, Source: ZTE, Sanechips, Agenda Item: 7.2.1.2, all pages. Best Available Date: Feb. 25-Mar. 1, 2019.

"2 Step RA: MAC PDU Format for MsgB," 3GPP TSG-RAN2 106, R2-1905722, Reno, USA, May 13-May 17, 2019, Source: Samsung, Agenda item: 11.13.4, all pages.

International Search Report for PCT application PCT/CN2020/093975, issued on Aug. 27, 2020, and its English Translation provided by WIPO.

Written Opinion PCT application PCT/CN2020/093975, issued on Aug. 27, 2020, and its English Translation provided by WIPO.

International Preliminary Report on Patentability for PCT application PCT/CN2020/093975, issued on Feb. 1, 2022, with English translation provided by WIPO.

"MsgB content and format," 3GPP TSG-WG2 Meeting #106, R2-1906306, USA, Reno, May 13-17, 2019, Source: ZTE, Sanechips, Agenda Item: 11.13.4, all pages.

First Office Action and search report for Chinese Patent Application 201910690619.2 issued Nov. 2, 2021 and its English Translation provided by applicant's foreign counsel, all pages.

Second Office Action for Chinese Patent Application 201910690619.2 issued May 19, 2022, and its English Translation provided by applicant's foreign counsel, all pages.

Extended European Search Report for European Patent Application 20846922.1 issued on Jul. 26, 2022.

3rd Generation Partnership Project; Technical Specification Group Radio Access Network; NR; Medium Access Control (MAC) protocol specification (Release 15), 3GPP TS 38.321 V15.6.0 (Jun. 2019).

* cited by examiner

INFORMATION PROCESSING METHOD, DEVICE AND APPARATUS, AND COMPUTER-READABLE STORAGE MEDIUM

CROSS-REFERENCE TO RELATED APPLICATIONS

The present application is the U.S. national phase of PCT Application No. PCT/CN2020/093975 filed on Jun. 2, 2020, which claims a priority to the Chinese patent application 201910690619.2 filed on Jul. 29, 2019, the disclosures of which are incorporated herein by reference in their entireties.

TECHNICAL FIELD

The present disclosure relates to the field of communication technology, in particular to an information processing method, an information processing device, an information processing apparatus and a computer-readable storage medium.

BACKGROUND

Long Term Evolution (LTE) random access and New Radio (NR) conventional random access include contention-based random access and non-contention-based random access.

As shown in FIG. 1, a contention-based random access procedure for the contention-based random access includes four steps, i.e., 4-step Random Access Channel (RACH).

Msg1: a User Equipment (UE) selects a random access preamble and a Physical Random Access Channel (PRACH) resource, and transmits the selected random access preamble to a base station using the PRACH resource.

Msg2: upon the receipt of the preamble, the base station transmits a random access response. The random access response includes two parts, i.e., a Medium Access Control (MAC) header and an MAC Random Access Response (RAR). The MAC header includes a plurality of sub-headers, its main content includes a Random Access Preamble Identity (RAPID) and a Backoff Indicator (BI).

Msg3: the UE performs uplink transmission on an Uplink (UL) grant designated in Msg2, and contents transmitted in Msg3 are different due to different random access reasons. For example, for an initial access, a Radio Resource Control (RRC) connection establishment request is transmitted in Msg3, and a Cell Radio Network Temporary Identifier (C-RNTI) MAC Control Element (CE) is transmitted by the UE in a connected state in Msg3. In a word, a UE-specific identifier is transmitted in Msg3 so that the base station finally determines the UE uniquely.

Msg4 (contention resolution message): the UE determines whether the random access is performed successfully in accordance with Msg4. For the UE in an idle state or in an inactive state, Msg4 carries a Common Control Channel (CCCH) MAC CE including RRC signaling in Msg3. For the UE in the connected state, Msg4 is scheduled through a Physical Downlink Control Channel (PDCCH) with a unique C-RNTI of the UE in a cell, and the contention resolution is performed through the PDCCH. For the UE in the idle state or the inactive state, after the contention resolution is performed successfully, the C-RNTI is converted into the unique C-RNTI of the UE in the cell.

In a New Radio (NR) system, a 2-step RACH is proposed on the basis of the 4-step RACH for the contention-based random access. In this process, in order to optimize resource efficiency, in some cases, the message further needs to be reused. Hence, there is a need to provide a method for indicating the reuse of the information.

SUMMARY

An object of the present disclosure is to provide an information processing method, an information processing device, an information processing apparatus, and a computer-readable storage medium, so as to reduce signaling overhead.

In one aspect, the present disclosure provides in some embodiments an information processing method for a network side device, including, in a random access procedure, transmitting a random access response message to a UE. The random access response message includes at least one MAC data sub-header, and the MAC data sub-header is used to indicate information about a response message and/or information about a data message included in the random access response message.

In some possible embodiments of the present disclosure, the random access response message further includes at least one of information about at least one response message and information about at least one data message.

In some possible embodiments of the present disclosure, the information about the at least one response message and/or the information about the at least one data message include information about response messages for at least one UE and/or information about data messages for at least one UE.

In some possible embodiments of the present disclosure, the MAC data sub-header has a first indication bit of a first predetermined value, and the MAC data sub-header includes an RAPID.

In some possible embodiments of the present disclosure, in the case that the RAPID belongs to a first set, the response message includes a response indicating the UE to fall back to a 4-step random access procedure, and the response indicating the UE to fall back to the 4-step random access procedure has a length with a predetermined value.

In some possible embodiments of the present disclosure, the MAC data sub-header has a first indication bit of a first predetermined value and a second indication bit of a second predetermined value, and the MAC data sub-header includes a BI.

In some possible embodiments of the present disclosure, the MAC data sub-header has a first indication bit of a first predetermined value, a second indication bit of the first predetermined value, and a third indication bit of a second predetermined value, and the response message includes a random access success response message.

In some possible embodiments of the present disclosure, the MAC data sub-header has a first indication bit of a first predetermined value, a second indication bit of the first predetermined value, and a third indication bit of the first predetermined value, and the response message includes a random access success response message and a data message.

In some possible embodiments of the present disclosure, a designated indication bit in the MAC data sub-header is used to indicate a length of the data message.

In some possible embodiments of the present disclosure, the length of the data message has a predefined or preconfigured value.

In another aspect, the present disclosure provides in some embodiments an information processing method for a UE, including: in a random access procedure, receiving a random access response message from a network side device, the random access response message including at least one MAC data sub-header; and obtaining data related to the UE in accordance with the MAC data sub-header. The MAC data sub-header is used to indicate information about a response message and/or information about a data message included in the random access response message.

In some possible embodiments of the present disclosure, the MAC data sub-header has a first indication bit of a first predetermined value and a second indication bit of a second predetermined value, and the MAC data sub-header includes a BI.

In some possible embodiments of the present disclosure, the obtaining the data related to the UE in accordance with the MAC data sub-header includes: in the case that the MAC data sub-header is used to indicate the information about the response message in the random access response message, obtaining the response message; and in the case that the MAC data sub-header is used to indicate the information about the data message in the random access response message, obtaining the data message in accordance with a predefined or preconfigured length of the data message.

In some possible embodiments of the present disclosure, the obtaining the data related to the UE in accordance with the MAC data sub-header includes, in the case that the MAC data sub-header has a first indication bit of a first predetermined value and the MAC data sub-header includes an RAPID belonging to a first set, obtaining a response indicating the UE to fall back to a 4-step random access procedure. A length of the response indicating the UE to fall back to the 4-step random access procedure has a predetermined value.

In some possible embodiments of the present disclosure, the obtaining the data related to the UE in accordance with the MAC data sub-header includes, in the case that the MAC data sub-header has a first indication bit of a first predetermined value, a second indication bit of the first predetermined value and a third indication bit of a second predetermined value, obtaining a random access success response message.

In some possible embodiments of the present disclosure, the obtaining the data related to the UE in accordance with the MAC data sub-header includes, in the case that the MAC data sub-header has a first indication bit of a first predetermined value, a second indication bit of the first predetermined value and a third indication bit of the first predetermined value, obtaining a random access success response massage and a data message.

In some possible embodiments of the present disclosure, the method further includes determining a length of the data message in accordance with a designated indication bit in the MAC data sub-header.

In some possible embodiments of the present disclosure, in the case that the information about the at least one response message and/or the information about the at least one data message include information about response messages for at least one UE and/or information about data messages for at least one UE, the obtaining the data related to the UE in accordance with the MAC data sub-header includes obtaining the response message and/or data message related to the UE from the response messages for at least one UE and/or the data messages for at least one UE in accordance with an identifier of the UE.

In yet another aspect, the present disclosure provides in some embodiments an information processing device for a network side device, including a transmission module configured to, in a random access procedure, transmit a random access response message to a UE. The random access response message includes at least one MAC data sub-header, and the MAC data sub-header is used to indicate information about a response message and/or information about a data message included in the random access response message.

In some possible embodiments of the present disclosure, the random access response message further includes at least one of information about at least one response message and information about at least one data message.

In still yet another aspect, the present disclosure provides in some embodiments an information processing device for a UE, including: a reception module configured to, in a random access procedure, receive a random access response message from a network side device, the random access response message including at least one MAC data sub-header; and a processing module configured to obtain data related to the UE in accordance with the MAC data sub-header. The MAC data sub-header is used to indicate information about a response message and/or information about a data message included in the random access response message.

In some possible embodiments of the present disclosure, the processing module includes: a first obtaining sub-module configured to, in the case that the MAC data sub-header is used to indicate the information about the response message in the random access response message, obtain the response message; and a second obtaining sub-module configured to, in the case that the MAC data sub-header is used to indicate the information about the data message in the random access response message, obtaining the data message in accordance with a predefined or preconfigured length of the data message.

In still yet another aspect, the present disclosure provides in some embodiments an information processing apparatus for a network side device, including a transceiver, a memory, a processor, and a program stored in the memory and executed by the processor. The transceiver is configured to, in a random access procedure, transmit a random access response message to a UE. The random access response message includes at least one MAC data sub-header, and the MAC data sub-header is used to indicate information about a response message and/or information about a data message included in the random access response message.

In some possible embodiments of the present disclosure, the random access response message further includes at least one of information about at least one response message and information about at least one data message.

In some possible embodiments of the present disclosure, the information about the at least one response message and/or the information about the at least one data message include information about response messages for at least one UE and/or information about data messages for at least one UE.

In some possible embodiments of the present disclosure, the MAC data sub-header has a first indication bit of a first predetermined value, and the MAC data sub-header includes an RAPID.

In some possible embodiments of the present disclosure, in the case that the RAPID belongs to a first set, the response message includes a response indicating the UE to fall back to a 4-step random access procedure, and the response indicating the UE to fall back to the 4-step random access procedure has a length with a predetermined value.

In some possible embodiments of the present disclosure, the MAC data sub-header has a first indication bit of a first predetermined value and a second indication bit of a second predetermined value, and the MAC data sub-header includes a BI; or the MAC data sub-header has the first indication bit of the first predetermined value, the second indication bit of the first predetermined value, and a third indication bit of the second predetermined value, and the response message includes a random access success response message; or the MAC data sub-header has the first indication bit of the first predetermined value, the second indication bit of the first predetermined value, and the third indication bit of the first predetermined value, and the response message includes the random access success response message and a data message.

In some possible embodiments of the present disclosure, in the case that the response message includes the random access success response message and the data message, a designated indication bit in the MAC data sub-header is used to indicate a length of the data message.

In some possible embodiments of the present disclosure, the length of the data message has a predefined or preconfigured value.

In still yet another aspect, the present disclosure provides in some embodiments an information processing apparatus for a UE, including a transceiver, a memory, a processor, and a program stored in the memory and executed by the processor. The transceiver is configured to, in a random access procedure, receive a random access response message from a network side device, and the random access response message includes at least one MAC data sub-header. The processor is configured to read the program in the memory, so as to obtain data related to the UE in accordance with the MAC data sub-header. The MAC data sub-header is used to indicate information about a response message and/or information about a data message included in the random access response message.

In some possible embodiments of the present disclosure, the MAC data sub-header has a first indication bit of a first predetermined value and a second indication bit of a second predetermined value, and the MAC data sub-header includes a BI.

In some possible embodiments of the present disclosure, the processor is further configured to read the program in the memory, so as to: in the case that the MAC data sub-header is used to indicate the information about the response message in the random access response message, obtain the response message; and in the case that the MAC data sub-header is used to indicate the information about the data message in the random access response message, obtain the data message in accordance with a predefined or preconfigured length of the data message.

In some possible embodiments of the present disclosure, the processor is further configured to read the program in the memory, so as to: in the case that the MAC data sub-header has a first indication bit of a first predetermined value and the MAC data sub-header includes an RAPID belonging to a first set, obtain a response indicating the UE to fall back to a 4-step random access procedure, a length of the response indicating the UE to fall back to the 4-step random access procedure having a predetermined value; or in the case that the MAC data sub-header has the first indication bit of the first predetermined value, a second indication bit of the first predetermined value and a third indication bit of a second predetermined value, obtain a random access success response message; or in the case that the MAC data sub-header has the first indication bit of the first predetermined value, the second indication bit of the first predetermined value and the third indication bit of the first predetermined value, obtain the random access success response massage and a data message.

In some possible embodiments of the present disclosure, the processor is further configured to read the program in the memory, so as to determine a length of the data message in accordance with a designated indication bit in the MAC data sub-header.

In some possible embodiments of the present disclosure, the processor is further configured to read the program in the memory, so as to, in the case that the information about the at least one response message and/or the information about the at least one data message include information about response messages for at least one UE and/or information about data messages for at least one UE, obtain the response message and/or data message related to the UE from the response messages for at least one UE and/or the data messages for at least one UE in accordance with an identifier of the UE.

In still yet another aspect, the present disclosure provides a computer-readable storage medium storing therein a computer program. The computer program is executed by a processor so as to implement the steps in the method for the network side device or the steps in the method for the UE.

According to the embodiments of the present disclosure, the information about the response message and/or the information about the data message are indicated through the MAC data sub-header in the random access response message. As a result, it is able to indicate contents in the random access message without any additional indication bit, thereby to reduce signaling overhead.

BRIEF DESCRIPTION OF THE DRAWINGS

In order to illustrate the technical solutions of the present disclosure in a clearer manner, the drawings desired for the present disclosure will be described hereinafter briefly. Obviously, the following drawings merely relate to some embodiments of the present disclosure, and based on these drawings, a person skilled in the art may obtain the other drawings without any creative effort.

DETAILED DESCRIPTION

In order to make the objects, the technical solutions and the advantages of the present disclosure more apparent, the present disclosure will be described hereinafter in a clear and complete manner in conjunction with the drawings and embodiments. Obviously, the following embodiments merely relate to a part of, rather than all of, the embodiments of the present disclosure, and based on these embodiments, a person skilled in the art may, without any creative effort, obtain the other embodiments, which also fall within the scope of the present disclosure.

Figure 1:
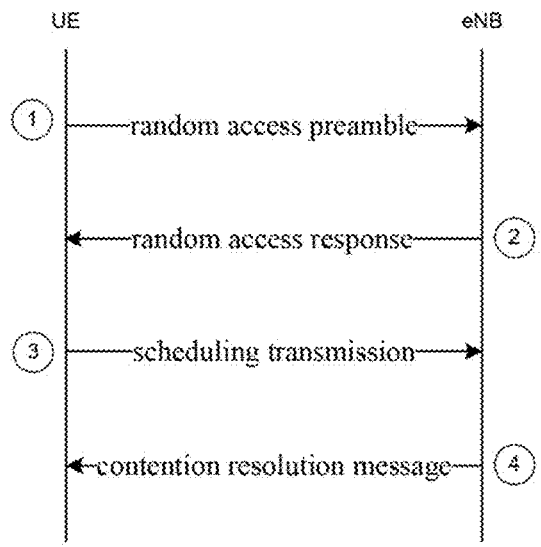
FIG. 1 is a schematic view showing a 4-step RACH process.
Figure 2:
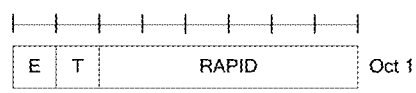
FIG. 2 is a schematic view showing an MAC sub-header with an RAPID.
Figure 3:
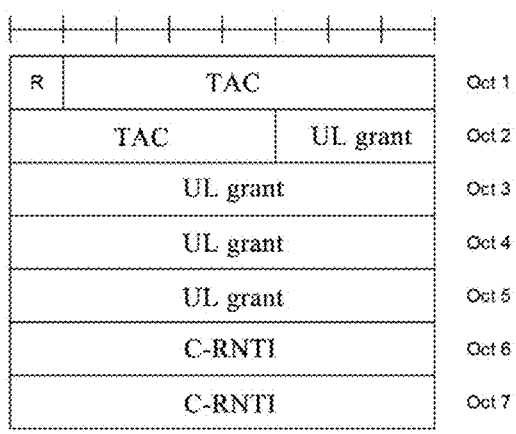
FIG. 3 is a schematic view showing an MAC RAR.

In a 4-step RACH in FIG. 1, FIG. 2 shows an MAC sub-header with an RAPID. FIG. 3 shows an MAC RAR, which includes a Time Advance Command (TAC), a UL grant for Msg3, and a C-RNTI) allocated by a network side. A Physical Downlink Control Channel (PDCCH) carrying Msg2 scheduling information and a Physical Downlink Shared Channel (PDSCH) carrying Msg2 are scrambled using a Random Access RNTI (RA-RNTI). The RA-RNTI uniquely corresponds to a time-frequency resource for transmitting Msg1 within a window length where Msg2 is received by a UE, and RA-RNTI=1+s_id+14*t_id+14×80*f_id+14*80*8*ul_carrier_id (with a numerical range of 1 to 17920 in NR Rel-15).

In the above equation, s_id represents an index of a first OFDM symbol in a PRACH occasion (0≤s_id<14), t_id represents an index of a first slot for the PRACH occasion in a system frame (0≤t_id<80) and it is determined by a subcarrier spacing in accordance with a value of μ specified in a protocol, f_id represents an index of the PRACH occasion in a frequency domain (0≤f_id<8), and ul_carrier_id represents a UL carrier for transmitting a random access preamble (0 represents a NUL carrier, and 1 represents an SUL carrier).

When receiving Msg2, the UE determines that Msg2 corresponds to Msg1 transmitted by the UE in accordance with the RA-RNTI and a preamble ID.

Figure 4:
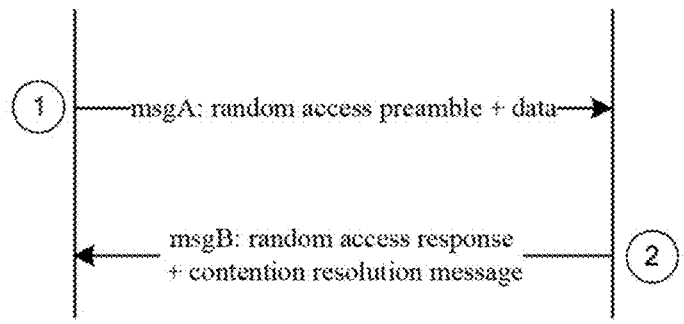
FIG. 4 is a schematic view showing a 2-step RACH process.

FIG. 4 shows a 2-step RACH, where msgA includes preamble transmission on the PRACH and data transmission on a Physical Uplink Shared Channel (PUSCH), and it is equivalent to Msg1 plus Msg3 in the 4-step RACH; msgB includes a random access response and contention resolution, and it is equivalent to Msg2 plus Msg4 in the 4-step RACH. Because msgB includes contention resolution information about the UE, its size is inevitably different from a size of Msg2. In the random access procedure as shown in FIG. 4, a base station may transmit a plurality of random access responses (or data messages) to the UE, e.g., a random access success response, a fall back response, an RAPID response, and a data message.

Based on the above 2-step random access procedure, there is a need to provide a method for indicating the reuse of the above-mentioned information.

Figure 5:
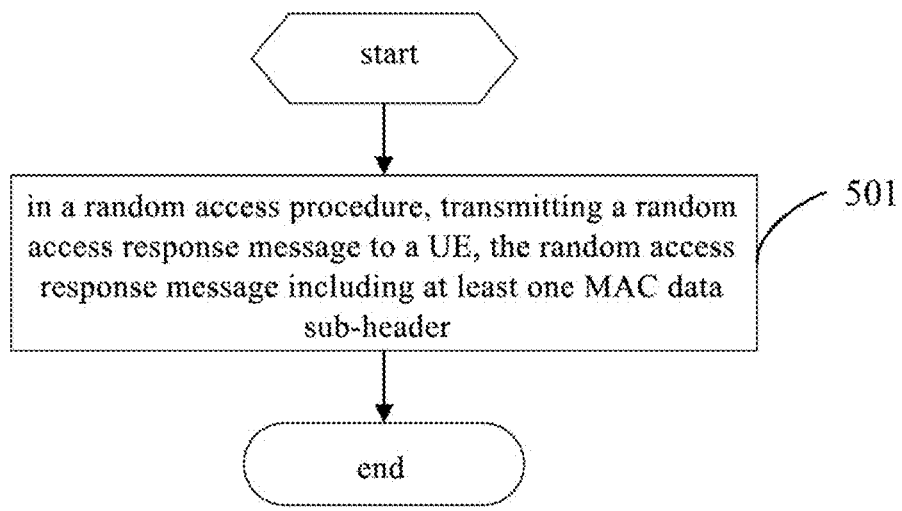
FIG. 5 is a flow chart of an information processing method according to one embodiment of the present disclosure.

As shown in FIG. 5, the present disclosure provides in some embodiments an information processing method for a network side device, which includes Step 501 of, in a random access procedure, transmitting a random access response message to a UE. The random access response message includes at least one MAC data sub-header, and the MAC data sub-header is used to indicate information about a response message and/or information about a data message included in the random access response message.

Through the MAC data sub-header, the UE determines whether the random access response message includes the response message or data message, a type of the response message, a length of the response message and a length of the data message.

In the embodiments of the present disclosure, the random access response message further includes at least one of information about at least one response message and information about at least one data message. In other words, in the embodiments of the present disclosure, a plurality of response messages is reused in a same random access response message, or the above information and some other data messages are reused in a same random access response message.

The information about the response message includes a type of the response message, e.g., a random access success response, a fallback response or an RAPID response, a length of the response message, UEs corresponding to the response message, etc. The information about the data message includes the data message, a length of the data message, etc.

In order to further reduce signaling overhead, the information about the at least one response message and/or the information about the at least one data message include information about response messages for at least one UE and/or information about data messages for at least one UE.

In the embodiments of the present disclosure, the MAC data sub-header has different formats, so the MAC data sub-header may be used to indicate whether the response message or data message is included.

In one circumstance, the MAC data sub-header has a first indication bit of a first predetermined value, and the MAC data sub-header includes an RAPID.

In this circumstance, when the RAPID belongs to a first set, the response message include a response indicating the UE to fall back to a 4-step random access procedure, and the response indicating the UE to fall back to the 4-step random access procedure has a length with a predetermined value. The first set is a predetermined set.

In another circumstance, the MAC data sub-header has a first indication bit of a first predetermined value and a second indication bit of a second predetermined value, and the MAC data sub-header includes a BI. In other words, in this circumstance, the random access response message does not include any response message or data message.

In yet another circumstance, the MAC data sub-header has a first indication bit of a first predetermined value, a second indication bit of the first predetermined value, and a third indication bit of a second predetermined value, and the response message includes a random access success response message.

In still yet another circumstance, the MAC data sub-header has a first indication bit of a first predetermined value, a second indication bit of the first predetermined value, and a third indication bit of the first predetermined value, and the response message includes a random access success response message and a data message.

In this circumstance, a designated indication bit in the MAC data sub-header is used to indicate a length of the data message.

The first indication bit, the second indication bit and the third indication bit may be any indication bits in the MAC data sub-header. The first predetermined value may be 1 and the second predetermined value may be 0. The designated indication bit may be any indication bit other than the first indication bit, the second indication bit and the third indication bit.

In the embodiments of the present disclosure, apart from being indicated by the designated indication bit, the length of the data message may also have a predefined or preconfigured value.

Based on the above, in the embodiments of the present disclosure, the information about the response message and/or the information about the data message are indicated through the MAC data sub-header in the random access response message. As a result, it is able to indicate contents in the random access message without any additional indication bit, thereby to reduce signaling overhead.

Figure 6:
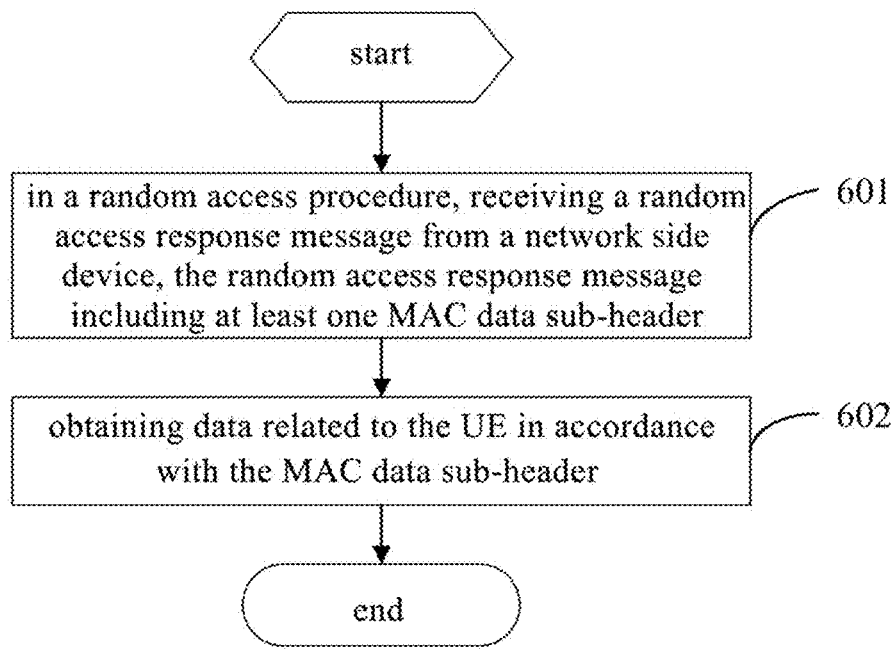
FIG. 6 is another flow chart of the information processing method according to one embodiment of the present disclosure.

As shown in FIG. 6, the present disclosure provides in some embodiments an information processing method for a UE, which includes: Step 601 of in a random access procedure, receiving a random access response message from a network side device, the random access response message including at least one MAC data sub-header, the MAC data sub-header being used to indicate information about a response message and/or information about a data message included in the random access response message; and Step 602 of obtaining data related to the UE in accordance with the MAC data sub-header.

In Step 602, the response message and/or the data message are obtained in accordance with different contents in the read MAC data sub-header, or merely the contents in the MAC data sub-header is obtained.

To be specific, in Step 602, in the case that the MAC data sub-header is used to indicate the information about the response message in the random access response message, the response message is obtained, and in the case that the MAC data sub-header is used to indicate the information about the data message in the random access response message, the data message is obtained in accordance with a predefined or preconfigured length of the data message.

For example, when the read MAC data sub-header has a first indication bit of a first predetermined value, a second indication bit of a second predetermined value and the MAC data sub-header includes a BI, the random access response message does not include any response message or data message in accordance with the obtained contents.

For example, when the read MAC data sub-header has a first indication bit of a first predetermined value and the MAC data sub-header includes an RAPID belonging to a first set, a response indicating the UE to fall back to a 4-step random access procedure is obtained. A length of the response indicating the UE to fall back to the 4-step random access procedure has a predetermined value.

For example, when the read MAC data sub-header has a first indication bit of a first predetermined value, a second indication bit of the first predetermined value and a third indication bit of a second predetermined value, a random access success response message is obtained.

For example, when the read MAC data sub-header has a first indication bit of a first predetermined value, a second indication bit of the first predetermined value and a third indication bit of the first predetermined value, a random access success response message and a data message are obtained. In addition, in this case, a length of the data message is determined in accordance with a designated indication bit in the MAC data sub-header.

In the above procedure, when the length of the data message is not indicated through the designated indication bit, the data message having a length of a predefined or preconfigured value is obtained.

In order to reduce the signaling overhead, the information about the at least one response message and/or the information about the at least one data message include information about response messages for at least one UE and/or information about data messages for at least one UE. After obtaining the response message or data message, the response message and/or data message related to the UE is further obtained from the response messages for at least one UE and/or the data messages for at least one UE in accordance with an identifier of the UE.

Based on the above, in the embodiments of the present disclosure, the information about the response message and/or the information about the data message are indicated through the MAC data sub-header in the random access response message. As a result, it is able to indicate contents in the random access message without any additional indication bit, thereby to reduce signaling overhead.

An implementation procedure will be described hereinafter in more details in conjunction with different embodiments.

In the embodiments of the present disclosure, a format of the random access response message is defined again, so as to indicate whether the random access message includes a plurality of random access response messages or data messages to the UE. To be specific, the following contents are defined: each MAC data sub-header in an MAC message, a plurality of combination forms of the MAC data sub-headers and the subsequent data, and meanings of several bits in each MAC data sub-header.

Figure 7:
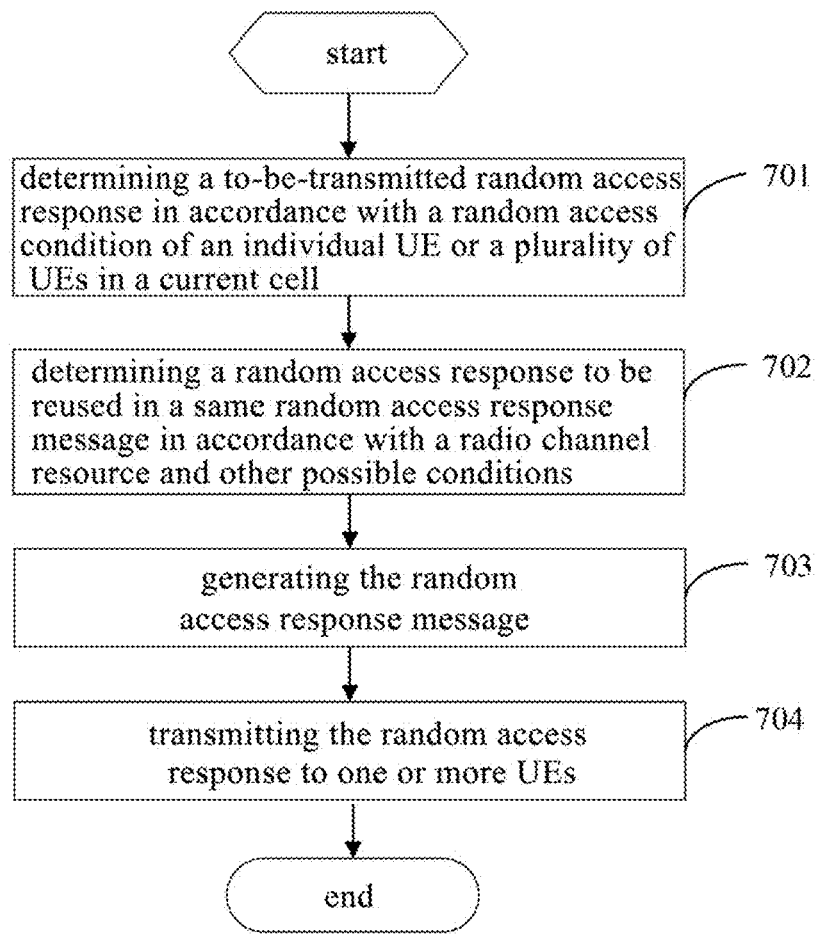
FIG. 7 is yet another flow chart of the information processing method according to one embodiment of the present disclosure.

At a base station side, as shown in FIG. 7, the information processing method in the embodiments of the present disclosure includes the following steps.

Step 701: determining a to-be-transmitted random access response in accordance with a random access condition of an individual UE or a plurality of UEs in a current cell.

The to-be-transmitted random access response includes a random access success response, a fallback response, an RAPID, or a data message.

In actual use, a limitation on some message combinations is applied to the base station in accordance with the practical need. For example, for a certain UE A, the data message is reused merely when the success response is transmitted by the base station to the UE A.

Step 702: determining a random access response to be reused in a same random access response message in accordance with a radio channel resource and other possible conditions.

For example, the base station determines the UEs, the random access responses for which are reused in a same random access response message, determines types of the random access response message which are reused in a same random access response message, and for a certain UE, determines whether the data message is to be reused.

Step 703: generating the random access response message.

Figure 8:
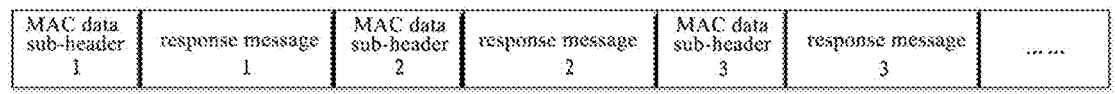
FIG. 8 is a schematic view showing a random access response message according to one embodiment of the present disclosure.

The above response message or data message is reused in a certain format, and a resultant message format is shown in FIG. 8. The message includes at least one MAC data sub-header and at least one response message and/or data message.

One or more MAC data sub-headers are placed by the base station in front of one or more MAC data sub-units, and a plurality of MAC data sub-units are spliced to form a complete MAC data unit. In this structure, the base station indicates whether there is the response message or a length of the response message (i.e., contents in the response message) through each sub-header.

Figure 9A:
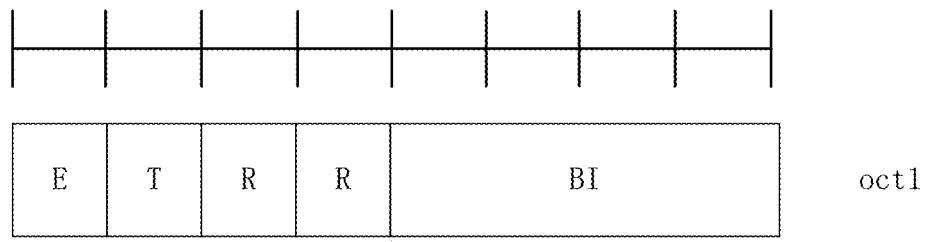
FIGS. 9A and 9B are schematic views showing an MAC data sub-header.
Figure 9B:
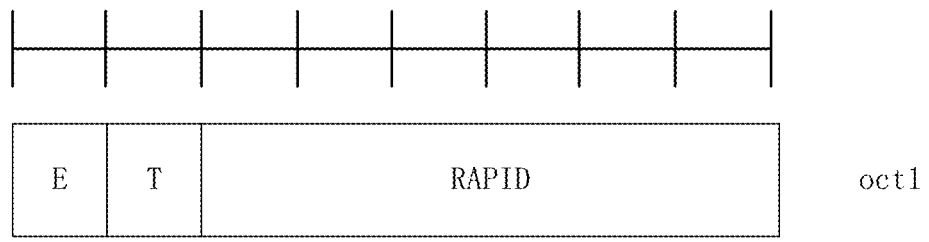

As shown in FIGS. 9A and 9B, whether there is the response message, a type of the response message and whether the data message is included directly depend on contents in an MAC data sub-header k. FIGS. 9A and 9B show examples of the MAC data sub-headers, i.e., two MAC data sub-headers each including 8 bits (each byte includes 8 bits). In the two data sub-headers, each indication bit needs to have a related definition.

As shown in FIG. 9A, when T is 1, it means that the subsequent content does not include any RAPID. When T is 1 and a first R is 0, it means that the subsequent content in the indication bits includes the BI. When T is 1 and a first R is 1, it means that the subsequent content includes the BI. As shown in FIG. 9B, when T is 0, it means that the subsequent content includes the RAPID.

Step 704: transmitting the random access response to one or more UEs.

Different formats of the MAC data sub-header and different indication modes of the information will be described hereinafter. In the embodiments of the present disclosure, there are the following message formats, which are applied to any data sub-header k and the subsequent response message or data message.

Figure 10A:
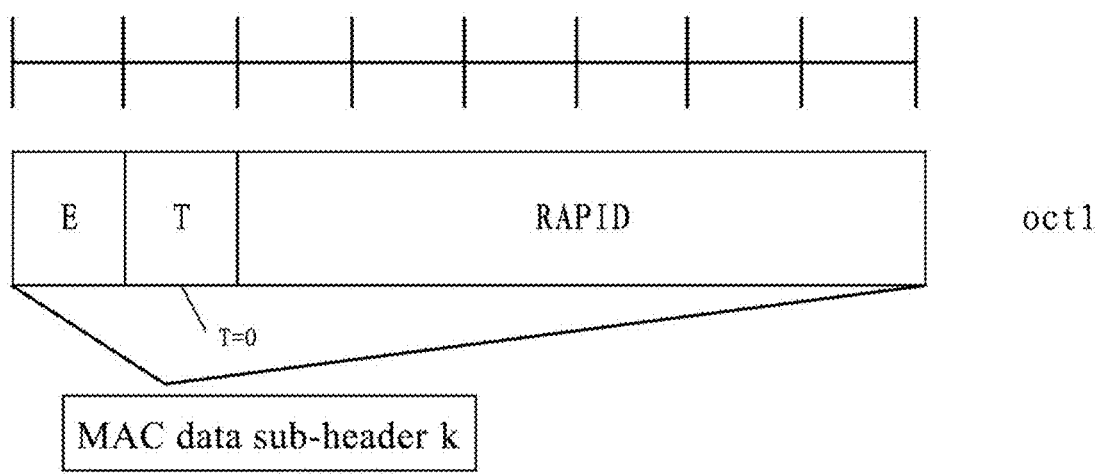
FIGS. 10A to 10E are schematic views showing the MAC data sub-header.

As shown in FIG. 10A, T is 0. In this case, FIG. 10A shows the MAC data sub-header, and the RAPID is a random access preamble ID.

Figure 10B:
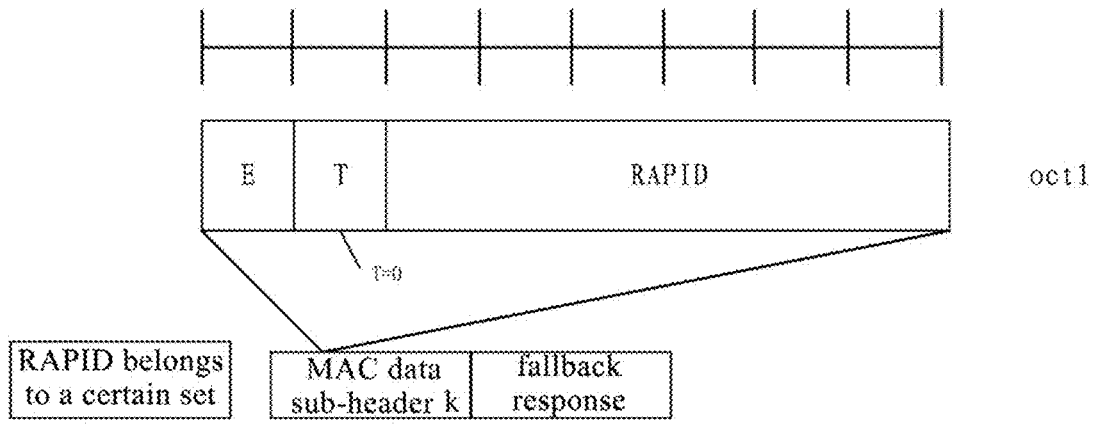

In addition, as shown in FIG. 10B, whether a fallback response is included after the sub-header is further determined in accordance with different values of the RAPID. When the fallback response is included, a length of the fallback response is constant. For example, when the RAPID belongs to a predefined set set_S1, it means that a fallback response is included after the sub-header; otherwise, no fallback response is included. When the RAPID does not belong to the predefined set set_S1, a structure of the MAC data sub-header is shown in FIG. 10A.

Figure 10C:
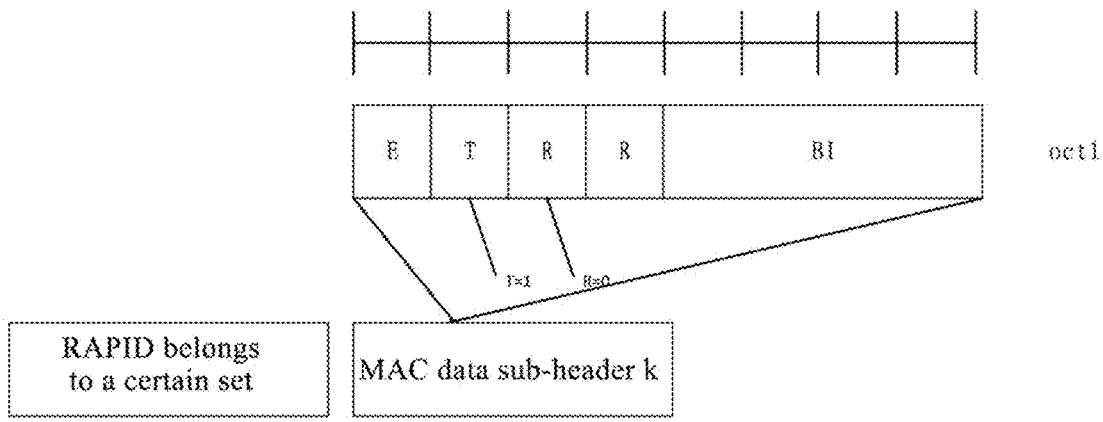

As shown in FIG. 10C, T is 1 and the first R is 0. In this case, no other response message is included after the sub-header. Here, the BI represents a backoff indicator in the random access procedure.

Figure 10D:
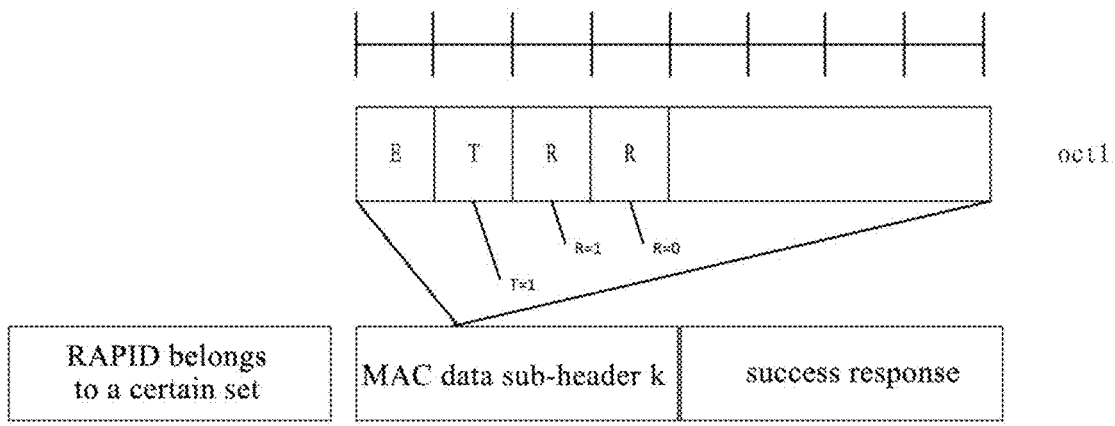

As shown in FIG. 10D, T is 1, the first R is 1, and a second R is 0. In this case, a random access success response is included after the sub-header.

Figure 10E:
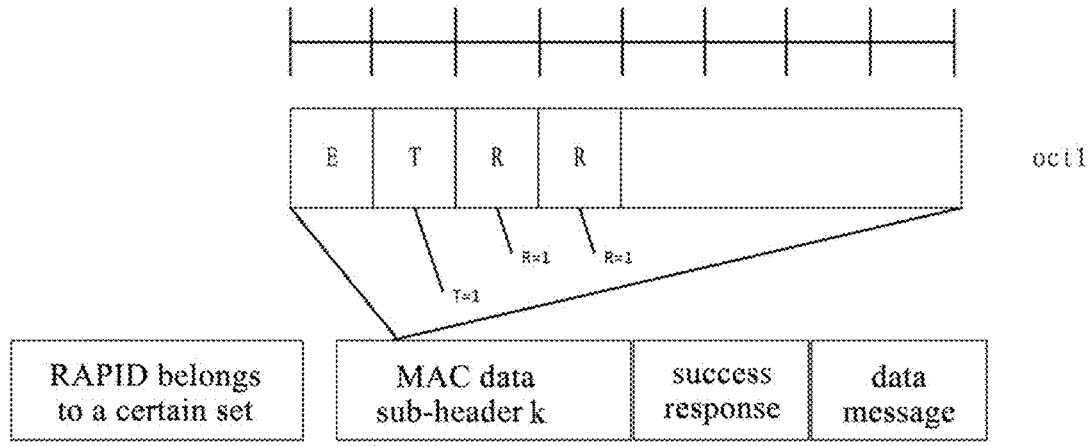

As shown in FIG. 10E, T is 1, the first R is 1 and the second R is 1. In this case, a random access success response and a data message are included after the sub-header.

When the MAC data sub-header indicates that the subsequent response message includes the success response and the data message, a part of, or all of, last four bits in the MAC sub-header k are used to indicate the length of the data message. When all the four bits are used, at most sixteen different data lengths are indicated. When merely one bit is used, two data lengths are indicated. The UE parses the sub-header to obtain the length of the data message.

Of course, in actual use, the length of the data message is also a predefined or preconfigured value.

Figure 11:
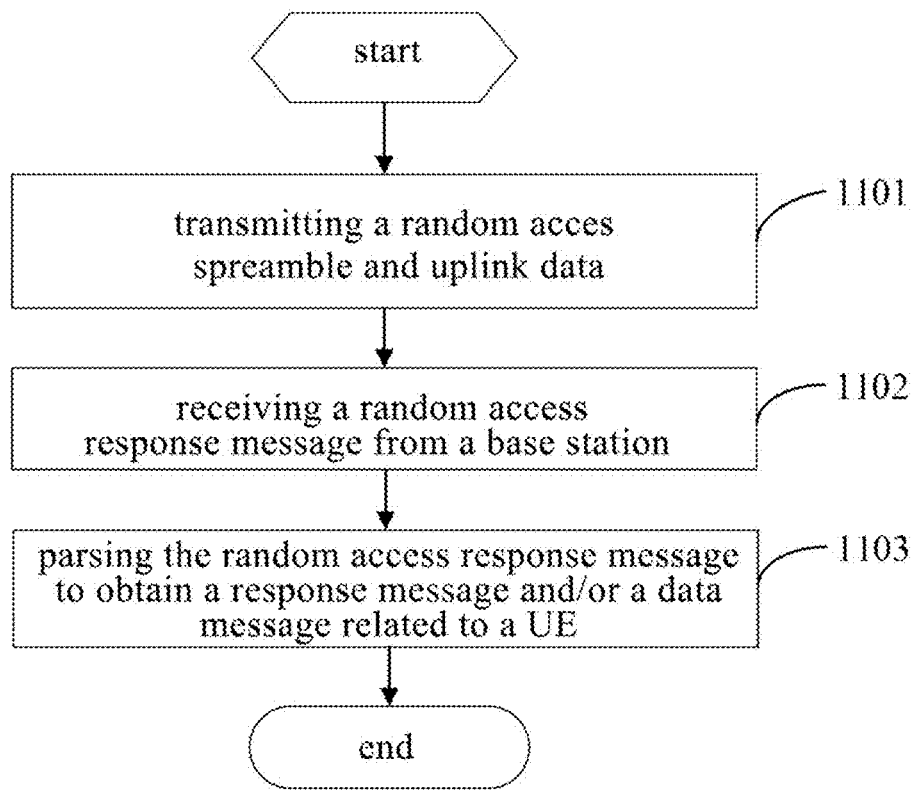
FIG. 11 is still yet another flow chart of the information processing method according to one embodiment of the present disclosure.

At a UE side, as shown in FIG. 11, the information processing method includes the following steps.

Step 1101: transmitting a random access preamble and uplink data.

Step 1102: receiving a random access response message from the base station.

Step 1103: parsing the random access response message to obtain a response message and/or a data message related to the UE.

To be specific, the UE parses the data sub-headers one by one, so as to determine a length of each possible message section or data section in the entire response message, and finally receive the data related to the UE.

For example, the UE splits the random access response message, determines whether there is a response message or data message after a first MAC data sub-header, and if yes, obtains the response message or a length of the data message. Then, the UE obtains a second MAC data sub-header, determines whether there is a response message or data message after the second MAC data sub-header, and if yes, obtains the response message or a length of the data message. The above procedure is repeated until a last MAC data sub-header has been parsed. Next, the UE receives the data and obtains the response message or data message related to the UE.

Based on the above description, in the embodiments of the present disclosure, it is able to reuse various random access response message formats for one or more UEs in a same message, and reuse the data messages. As a result, it is able to improve the flexibility of the random access response for a network, and improve resource utilization.

Figure 12:
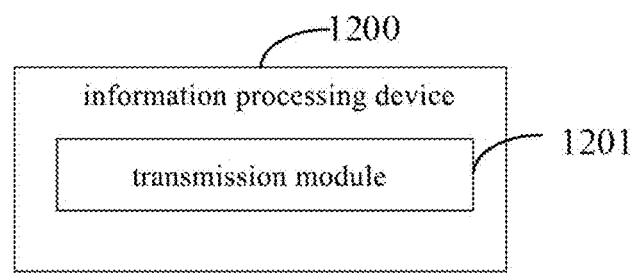
FIG. 12 is a schematic view showing an information processing device according to one embodiment of the present disclosure.

The present disclosure further provides in some embodiments an information processing device for a network side device, as shown in FIG. 12. A principle of the information processing device for solving the problem is similar to that of the above-mentioned information processing method, so the implementation of the information processing device may refer to that of the information processing method and will thus not be particularly defined herein. As shown in FIG. 12, the information processing device 1200 includes a transmission module 1201 configured to, in a random access procedure, transmit a random access response message to a UE. The random access response message includes at least one MAC data sub-header, and the MAC data sub-header is used to indicate information about a response message and/or information about a data message included in the random access response message.

In some possible embodiments of the present disclosure, the random access response message further includes at least one of information about at least one response message and information about at least one data message.

In some possible embodiments of the present disclosure, the information about the at least one response message and/or the information about the at least one data message include information about response messages for at least one UE and/or information about data messages for at least one UE.

In some possible embodiments of the present disclosure, the MAC data sub-header has a first indication bit of a first predetermined value, and the MAC data sub-header includes an RAPID.

In some possible embodiments of the present disclosure, in the case that the RAPID belongs to a first set, the response message includes a response indicating the UE to fall back to a 4-step random access procedure, and the response indicating the UE to fall back to the 4-step random access procedure has a length with a predetermined value.

In some possible embodiments of the present disclosure, the MAC data sub-header has a first indication bit of a first predetermined value and a second indication bit of a second predetermined value, and the MAC data sub-header includes a BI.

In some possible embodiments of the present disclosure, the MAC data sub-header has a first indication bit of a first predetermined value, a second indication bit of the first predetermined value, and a third indication bit of a second predetermined value, and the response message includes a random access success response message.

In some possible embodiments of the present disclosure, the MAC data sub-header has a first indication bit of a first predetermined value, a second indication bit of the first predetermined value, and a third indication bit of the first predetermined value, and the response message includes a random access success response message and a data message.

In some possible embodiments of the present disclosure, a designated indication bit in the MAC data sub-header is used to indicate a length of the data message.

In some possible embodiments of the present disclosure, the length of the data message has a predefined or preconfigured value.

The information processing device in the embodiments of the present disclosure is used to implement the above-mentioned information processing method with a similar principle and a similar technical effect, which will thus not be particularly defined herein.

Figure 13:
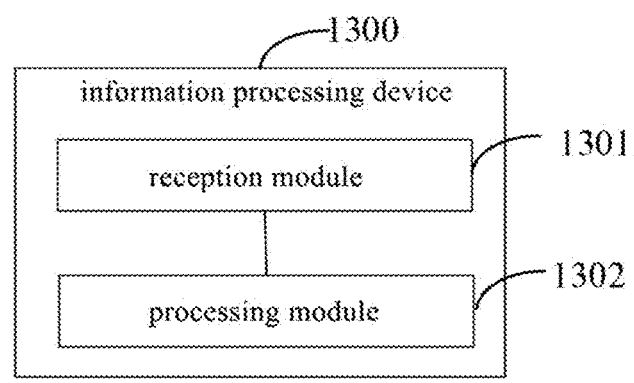
FIG. 13 is another schematic view showing the information processing device according to one embodiment of the present disclosure.

The present disclosure further provides in some embodiments an information processing device for a UE, as shown in FIG. 13. A principle of the information processing device for solving the problem is similar to that of the above-mentioned information processing method, so the implementation of the information processing device may refer to that of the information processing method and will thus not be particularly defined herein. As shown in FIG. 13, the information processing device 1300 includes: a reception module 1301 configured to, in a random access procedure, receive a random access response message from a network side device, the random access response message including at least one MAC data sub-header; and a processing module 1302 configured to obtain data related to the UE in accordance with the MAC data sub-header. The MAC data sub-header is used to indicate information about a response message and/or information about a data message included in the random access response message.

In some possible embodiments of the present disclosure, the processing module 1302 includes: a first obtaining sub-module configured to, in the case that the MAC data sub-header is used to indicate the information about the response message in the random access response message, obtain the response message; and a second obtaining sub-module configured to, in the case that the MAC data sub-header is used to indicate the information about the data message in the random access response message, obtaining the data message in accordance with a predefined or pre-configured length of the data message.

In some possible embodiments of the present disclosure, the MAC data sub-header has a first indication bit of a first predetermined value and a second indication bit of a second predetermined value, and the MAC data sub-header includes a BI.

In some possible embodiments of the present disclosure, the processing module 1302 is specifically configured to, in the case that the MAC data sub-header has a first indication bit of a first predetermined value and the MAC data sub-header includes an RAPID belonging to a first set, obtain a response indicating the UE to fall back to a 4-step random access procedure. A length of the response indicating the UE to fall back to the 4-step random access procedure has a predetermined value.

In some possible embodiments of the present disclosure, the processing module 1302 is specifically configured to, in the case that the MAC data sub-header has the first indication bit of the first predetermined value, a second indication bit of the first predetermined value and a third indication bit of a second predetermined value, obtain a random access success response message.

In some possible embodiments of the present disclosure, the processing module 1302 is specifically configured to, in the case that the MAC data sub-header has the first indication bit of the first predetermined value, the second indication bit of the first predetermined value and the third indication bit of the first predetermined value, obtain the random access success response massage and a data message.

In some possible embodiments of the present disclosure, the processing module 1302 is further configured to determine a length of the data message in accordance with a designated indication bit in the MAC data sub-header.

In some possible embodiments of the present disclosure, in the case that the information about the at least one response message and/or the information about the at least one data message include information about response messages for at least one UE and/or information about data messages for at least one UE, the processing module 1302 is specifically configured to obtain the response message and/or data message related to the UE from the response messages for at least one UE and/or the data messages for at least one UE in accordance with an identifier of the UE.

The information processing device in the embodiments of the present disclosure is used to implement the above-mentioned information processing method with a similar principle and a similar technical effect, which will thus not be particularly defined herein.

Figure 14:
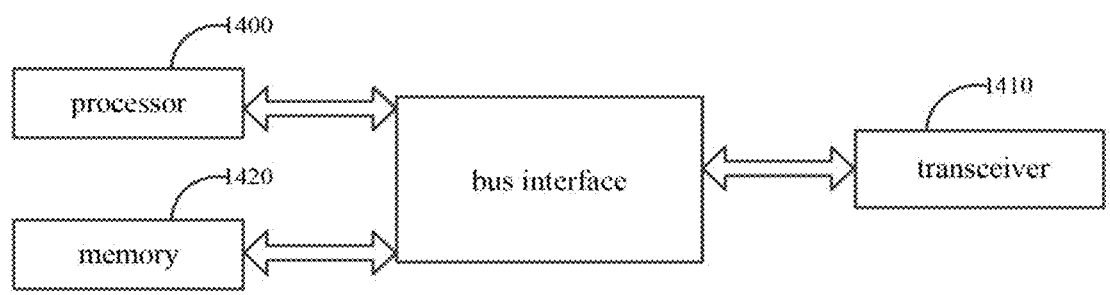
FIG. 14 is a schematic view showing an information processing apparatus according to one embodiment of the present disclosure.

As shown in FIG. 14, the present disclosure provides in some embodiments an information processing apparatus for a network side device, including a processor 1400, a transceiver 1410 and a memory 1420. The processor 1400 is configured to read a program stored in the memory 1402, so as to, in a random access procedure, transmit through the transceiver 1410 a random access response message to a UE. The random access response message includes at least one MAC data sub-header, and the MAC data sub-header is used to indicate information about a response message and/or information about a data message included in the random access response message. The transceiver 1410 is configured to receive and transmit data under the control of the processor 1400.

In FIG. 14, bus architecture may include a number of buses and bridges connected to each other, so as to connect various circuits for one or more processors 1400 and one or more memories 1420. In addition, as is known in the art, the bus architecture may be used to connect any other circuits, such as a circuit for a peripheral device, a circuit for a voltage stabilizer and a power management circuit. A bus interface may be provided, and the transceiver 1410 may consist of a plurality of elements, i.e., a transmitter and a receiver for communication with any other devices over a transmission medium.

The processor 1400 may take charge of managing the bus architecture as well as general processings. The memory 1420 may store therein data for the operation of the processor 1400.

In some possible embodiments of the present disclosure, the random access response message further includes at least one of information about at least one response message and information about at least one data message.

In some possible embodiments of the present disclosure, the information about the at least one response message and/or the information about the at least one data message include information about response messages for at least one UE and/or information about data messages for at least one UE.

In some possible embodiments of the present disclosure, the MAC data sub-header has a first indication bit of a first predetermined value, and the MAC data sub-header includes an RAPID.

In some possible embodiments of the present disclosure, in the case that the RAPID belongs to a first set, the response message includes a response indicating the UE to fall back to a 4-step random access procedure, and the response indicating the UE to fall back to the 4-step random access procedure has a length with a predetermined value.

In some possible embodiments of the present disclosure, the MAC data sub-header has a first indication bit of a first predetermined value and a second indication bit of a second predetermined value, and the MAC data sub-header includes a BI.

In some possible embodiments of the present disclosure, the MAC data sub-header has a first indication bit of a first predetermined value, a second indication bit of the first predetermined value, and a third indication bit of a second predetermined value, and the response message includes a random access success response message.

In some possible embodiments of the present disclosure, the MAC data sub-header has a first indication bit of a first predetermined value, a second indication bit of the first predetermined value, and a third indication bit of the first predetermined value, and the response message includes a random access success response message and a data message.

In some possible embodiments of the present disclosure, a designated indication bit in the MAC data sub-header is used to indicate a length of the data message.

In some possible embodiments of the present disclosure, the length of the data message has a predefined or preconfigured value.

The information processing apparatus in the embodiments of the present disclosure is used to implement the above-mentioned information processing method with a similar principle and a similar technical effect, which will thus not be particularly defined herein.

Figure 15:
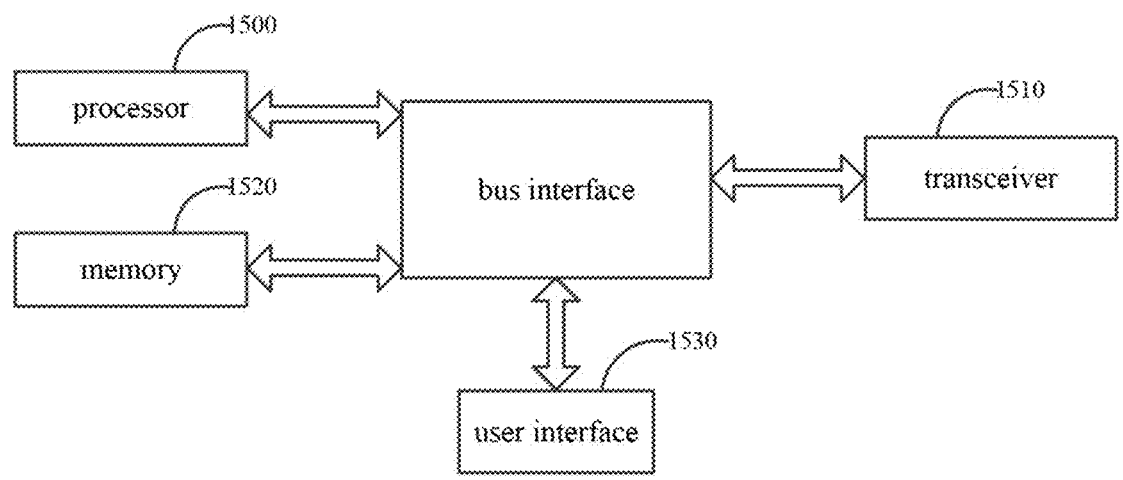
FIG. 15 is another schematic view showing the information processing apparatus according to one embodiment of the present disclosure.

As shown in FIG. 15, the present disclosure provides in some embodiments a UE, which includes a processor 1500 and a transceiver 1510. The transceiver 1510 is configured to, in a random access procedure, receive a random access response message from a network side device, and the random access response message includes at least one MAC data sub-header. The processor is configured to read the program in the memory, so as to obtain data related to the UE in accordance with the MAC data sub-header. The MAC data sub-header is used to indicate information about a response message and/or information about a data message included in the random access response message.

The transceiver 1510 is configured to receive and transmit data under the control of the processor 1500.

In FIG. 15, bus architecture may include a number of buses and bridges connected to each other, so as to connect various circuits for one or more processors 1500 and one or more memories 1520. In addition, as is known in the art, the bus architecture may be used to connect any other circuits, such as a circuit for a peripheral device, a circuit for a voltage stabilizer and a power management circuit. A bus interface may be provided, and the transceiver 1510 may consist of a plurality of elements, i.e., a transmitter and a receiver for communication with any other devices over a transmission medium. With respect to different UEs, a user interface 1530 may also be provided for devices which are to be arranged inside or outside the UE, and these devices may include but not limited to a keypad, a display, a speaker, a microphone and a joystick.

The processor 1500 may take charge of managing the bus architecture as well as general processings. The memory 1520 may store therein data for the operation of the processor 1500.

In some possible embodiments of the present disclosure, the MAC data sub-header has a first indication bit of a first predetermined value and a second indication bit of a second predetermined value, and the MAC data sub-header includes a BI.

In some possible embodiments of the present disclosure, the processor 1500 is further configured to read a computer program, so as to: in the case that the MAC data sub-header is used to indicate the information about the response message in the random access response message, obtain the response message; and in the case that the MAC data sub-header is used to indicate the information about the data message in the random access response message, obtain the data message in accordance with a predefined or preconfigured length of the data message.

In some possible embodiments of the present disclosure, the processor 1500 is further configured to read the computer program, so as to: in the case that the MAC data sub-header has a first indication bit of a first predetermined value and the MAC data sub-header includes an RAPID belonging to a first set, obtain a response indicating the UE to fall back to a 4-step random access procedure, a length of the response indicating the UE to fall back to the 4-step random access procedure having a predetermined value; or in the case that the MAC data sub-header has the first indication bit of the first predetermined value, a second indication bit of the first predetermined value and a third indication bit of a second predetermined value, obtain a random access success response message; or in the case that the MAC data sub-header has the first indication bit of the first predetermined value, the second indication bit of the first predetermined value and the third indication bit of the first predetermined value, obtain the random access success response massage and a data message.

In some possible embodiments of the present disclosure, the processor 1500 is further configured to read the computer program, so as to determine a length of the data message in accordance with a designated indication bit in the MAC data sub-header.

In some possible embodiments of the present disclosure, the processor 1500 is further configured to read the computer program, so as to, in the case that the information about the at least one response message and/or the information about the at least one data message include information about response messages for at least one UE and/or information about data messages for at least one UE, obtain the response message and/or data message related to the UE from the response messages for at least one UE and/or the data messages for at least one UE in accordance with an identifier of the UE.

The present disclosure further provides in some embodiments a computer-readable storage medium storing therein a computer program. The computer program is executed by a processor, so as to, in a random access procedure, transmit a random access response message to a UE. The random access response message includes at least one MAC data sub-header, and the MAC data sub-header is used to indicate information about a response message and/or information about a data message included in the random access response message.

In some possible embodiments of the present disclosure, the random access response message further includes at least one of information about at least one response message and information about at least one data message.

In some possible embodiments of the present disclosure, the information about the at least one response message and/or the information about the at least one data message include information about response messages for at least one UE and/or information about data messages for at least one UE.

In some possible embodiments of the present disclosure, the MAC data sub-header has a first indication bit of a first predetermined value, and the MAC data sub-header includes an RAPID.

In some possible embodiments of the present disclosure, in the case that the RAPID belongs to a first set, the response message includes a response indicating the UE to fall back to a 4-step random access procedure, and the response indicating the UE to fall back to the 4-step random access procedure has a length with a predetermined value.

In some possible embodiments of the present disclosure, the MAC data sub-header has a first indication bit of a first predetermined value and a second indication bit of a second predetermined value, and the MAC data sub-header includes a BI.

In some possible embodiments of the present disclosure, the MAC data sub-header has a first indication bit of a first predetermined value, a second indication bit of the first predetermined value, and a third indication bit of a second predetermined value, and the response message includes a random access success response message.

In some possible embodiments of the present disclosure, the MAC data sub-header has a first indication bit of a first predetermined value, a second indication bit of the first predetermined value, and a third indication bit of the first predetermined value, and the response message includes a random access success response message and a data message.

In some possible embodiments of the present disclosure, a designated indication bit in the MAC data sub-header is used to indicate a length of the data message.

In some possible embodiments of the present disclosure, the length of the data message has a predefined or preconfigured value.

The present disclosure further provides in some embodiments a computer-readable storage medium storing therein a computer program. The computer program is executed by a processor, so as to: in a random access procedure, receive a random access response message from a network side device, the random access response message including at least one MAC data sub-header; and obtain data related to the UE in accordance with the MAC data sub-header. The MAC data sub-header is used to indicate information about a response message and/or information about a data message included in the random access response message.

In some possible embodiments of the present disclosure, the MAC data sub-header has a first indication bit of a first predetermined value and a second indication bit of a second predetermined value, and the MAC data sub-header includes a BI.

In some possible embodiments of the present disclosure, the obtaining the data related to the UE in accordance with the MAC data sub-header includes: in the case that the MAC data sub-header is used to indicate the information about the response message in the random access response message, obtaining the response message; and in the case that the MAC data sub-header is used to indicate the information about the data message in the random access response message, obtaining the data message in accordance with a predefined or preconfigured length of the data message.

In some possible embodiments of the present disclosure, the obtaining the data related to the UE in accordance with the MAC data sub-header includes, in the case that the MAC data sub-header has a first indication bit of a first predetermined value and the MAC data sub-header includes an RAPID belonging to a first set, obtaining a response indicating the UE to fall back to a 4-step random access procedure. A length of the response indicating the UE to fall back to the 4-step random access procedure has a predetermined value.

In some possible embodiments of the present disclosure, the obtaining the data related to the UE in accordance with the MAC data sub-header includes, in the case that the MAC data sub-header has a first indication bit of a first predetermined value, a second indication bit of the first predetermined value and a third indication bit of a second predetermined value, obtaining a random access success response message.

In some possible embodiments of the present disclosure, the obtaining the data related to the UE in accordance with the MAC data sub-header includes, in the case that the MAC data sub-header has a first indication bit of a first predetermined value, a second indication bit of the first predetermined value and a third indication bit of the first predetermined value, obtaining a random access success response massage and a data message.

In some possible embodiments of the present disclosure, the method further includes determining a length of the data message in accordance with a designated indication bit in the MAC data sub-header.

In some possible embodiments of the present disclosure, in the case that the information about the at least one response message and/or the information about the at least one data message include information about response messages for at least one UE and/or information about data messages for at least one UE, the obtaining the data related to the UE in accordance with the MAC data sub-header includes obtaining the response message and/or data message related to the UE from the response messages for at least one UE and/or the data messages for at least one UE in accordance with an identifier of the UE.

It should be further appreciated that, the device and method may be implemented in any other ways. For example, the embodiments for the apparatus are merely for illustrative purposes, and the modules or units are provided merely on the basis of their logic functions. During the actual application, some modules or units may be combined together or integrated into another system. Alternatively, some functions of the module or units may be omitted or not executed. In addition, the coupling connection, direct coupling connection or communication connection between the modules or units may be implemented via interfaces, and the indirect coupling connection or communication connection between the modules or units may be implemented in an electrical or mechanical form or in any other form.

In addition, the functional units in the embodiments of the present disclosure may be integrated into a processing unit, or the functional units may exist independently, or two or more functional units may be combined together. These units may be implemented in the form of hardware, or hardware plus software.

The functional units implemented in a software form may be stored in a computer-readable medium. These software functional units may be stored in a storage medium and include several instructions so as to enable a computer device (a personal computer, a server or network device) to execute all or parts of the steps of the method according to the embodiments of the present disclosure. The storage medium includes any medium capable of storing therein program codes, e.g., a universal serial bus (USB) flash disk, a mobile hard disk (HD), a read-only memory (ROM), a random access memory (RAM), a magnetic disk or an optical disk.

It should be further appreciated that, the above modules are divided merely on the basis of their logic functions, and in actual use, they may be completely or partially integrated into a physical entity, or physically separated from each other. These modules may be implemented by calling software through a processing element, or implemented in the form of hardware. For example, the determination module may be a processing element arranged separately, or integrated into a chip of the above-mentioned device. In addition, it may be stored in the memory of the above-mentioned device in the form of a program code, and may be called and executed by a processing element of the above-mentioned device so as to achieve the above functions. The other modules may be implemented in a similar manner. All or parts of the modules may be integrated together or arranged separately. Here, the modules, units or assemblies may each of an Integrated Circuit (IC) having a signal processing capability. During the implementation, the steps of the method or the modules may be implemented through an integrated logic circuit of the processing element in the form of hardware or through instructions in the form of software.

For example, the above modules may be one or more ICs capable of implementing the above-mentioned method, e.g., one or more Application Specific Integrated Circuits (ASICs), one or more Digital Signal Processors (DSPs), or one or more Field Programmable Gate Array (FPGA). For another example, when a certain module is implemented by calling a program code through a processing element, the processing element may be a general-purpose processor, e.g., a Central Processing Unit (CPU) or any other processor capable of calling the program code. These modules may be integrated together and implemented in the form of system-on-a-chip (SOC).

Such words as "first" and "second" involved in the specification and the appended claims are merely used to differentiate different objects rather than to represent any specific order. It should be appreciated that, the data used in this way may be replaced with each other, so as to implement the embodiments in an order other than that shown in the drawings or described in the specification. In addition, such terms as "include" or "including" or any other variations involved in the present disclosure intend to provide non-exclusive coverage, so that a procedure, method, system, product or device including a series of steps or units may also include any other elements not listed herein, or may include any inherent steps or units of the procedure, method, system, product or device. In addition, the expression "and/or" in the description and the appended claims is merely used to represent at least one of the objects before and after the expression. For example, "A and/or B and/or C" represents seven situations, i.e., there is only A, there is only B, there is only C, there are both A and B, there are both B and C, thereby are both A and C, and there are A, B and C. Similarly, the phrase "at least one of A and B" in the specification and the appended claims shall be understood as "there is only A, there is only B, or there are both A and B".

The above embodiments are for illustrative purposes only, but the present disclosure is not limited thereto. Obviously, a person skilled in the art may make further modifications and improvements without departing from the spirit of the present disclosure, and these modifications and improvements shall also fall within the scope of the present disclosure.

What is claimed is:

1. An information processing method performed by a network side device, comprising, in a random access procedure, transmitting a random access response message to a User Equipment (UE), wherein the random access response message comprises at least one Medium Access Control (MAC) data sub-header and a data message, and the MAC data sub-header and the data message are used to indicate: (i) the data message included in the random access response message; or (ii) a response message and the data message included in the random access response message, wherein a T field of the MAC data sub-header is set to 1, a first R field of the MAC data sub-header is set to 1, a second R field of the MAC data sub-header is set to 1, and the response message indicating success response and the data message are attached to the MAC data sub-header immediately; and the MAC data sub-header indicates that the subsequent response message includes the random access success response and the data message, a part of, or all of, last four bits in the MAC data sub-header are used to indicate a length of the data message.

2. The information processing method according to claim 1, wherein the random access response message further comprises at least one of at least one response message and at least one data message.

3. The information processing method according to claim 2, wherein the at least one response message and/or the at least one data message comprise response messages for at least one UE and/or data messages for at least one UE.

4. The information processing method according to claim 1, wherein the MAC data sub-header has a first indication bit of a first predetermined value, and the MAC data sub-header comprises a Random Access Preamble Identity (RAPID).

5. The information processing method according to claim 4, wherein in the case that the RAPID belongs to a first set, the response message comprises a response indicating the UE to fall back to a 4-step random access procedure, and the response indicating the UE to fall back to the 4-step random access procedure has a length with a predetermined value.

6. The information processing method according to claim 1, wherein the MAC data sub-header has a first indication bit of a first predetermined value and a second indication bit of a second predetermined value, and the MAC data sub-header comprises a Backoff Indicator (BI).

7. The information processing method according to claim 1, wherein the MAC data sub-header has a first indication bit of a first predetermined value, a second indication bit of the first predetermined value, and a third indication bit of a second predetermined value, and the response message comprises a random access success response message.

8. The information processing method according to claim 1, wherein the MAC data sub-header has a first indication bit of a first predetermined value, a second indication bit of the first predetermined value, and a third indication bit of the first predetermined value, and the response message comprises a random access success response message and a data message.

9. The information processing method according to claim 8, wherein a designated indication bit in the MAC data sub-header is used to indicate a length of the data message.

10. The information processing method according to claim 2, wherein a length of one of the at least one data message has a predefined or preconfigured value.

11. An information processing method performed by a User Equipment (UE), comprising:
in a random access procedure, receiving a random access response message from a network side device, the random access response message comprising at least one Medium Access Control (MAC) data sub-header and a data message; and
obtaining data related to the UE in accordance with the MAC data sub-header,
wherein the MAC data sub-header and the data message are used to indicate: (i) the data message included in the random access response message; or (ii) a response message and the data message included in the random access response message,
wherein a T field of the MAC data sub-header is set to 1, a first R field of the MAC data sub-header is set to 1, a second R field of the MAC data sub-header is set to 1, and the response message indicating success response and the data message are attached to the MAC data sub-header immediately; and
the MAC data sub-header indicates that the subsequent response message includes the random access success response and the data message, a part of, or all of, last four bits in the MAC data sub-header are used to indicate a length of the data message.

12. The information processing method according to claim 11, wherein the MAC data sub-header has a first indication bit of a first predetermined value and a second indication bit of a second predetermined value, and the MAC data sub-header comprises a Backoff Indicator (BI).

13. The information processing method according to claim 11, wherein the obtaining the data related to the UE in accordance with the MAC data sub-header comprises:
in the case that the MAC data sub-header is used to indicate the response message in the random access response message, obtaining the response message; and
in the case that the MAC data sub-header is used to indicate the data message in the random access response message, obtaining the data message in accordance with a predefined or preconfigured length of the data message.

14. The information processing method according to claim 11, wherein the obtaining the data related to the UE in accordance with the MAC data sub-header comprises, in the case that the MAC data sub-header has a first indication bit of a first predetermined value and the MAC data sub-header comprises a Random Access Preamble Identity (RAPID) belonging to a first set, obtaining a response indicating the UE to fall back to a 4-step random access procedure, wherein a length of the response indicating the UE to fall back to the 4-step random access procedure has a predetermined value.

15. The information processing method according to claim 11, wherein the obtaining the data related to the UE in accordance with the MAC data sub-header comprises, in the case that the MAC data sub-header has a first indication bit of a first predetermined value, a second indication bit of the first predetermined value and a third indication bit of a second predetermined value, obtaining a random access success response message.

16. The information processing method according to claim 11, wherein the obtaining the data related to the UE in accordance with the MAC data sub-header comprises, in the case that the MAC data sub-header has a first indication bit of a first predetermined value, a second indication bit of the first predetermined value and a third indication bit of the first predetermined value, obtaining a random access success response massage and a data message.

17. The information processing method according to claim 16, further comprising determining a length of the data message in accordance with a designated indication bit in the MAC data sub-header.

18. The information processing method according to claim 11, wherein in the case that the at least one response message and/or the at least one data message comprise response messages for at least one UE and/or data messages for at least one UE, the obtaining the data related to the UE in accordance with the MAC data sub-header comprises obtaining the response message and/or data message related to the UE from the response messages for at least one UE and/or the data messages for at least one UE in accordance with an identifier of the UE.

19. A User Equipment (UE), comprising a transceiver, a memory, a processor, and a program stored in the memory and executed by the processor, wherein the transceiver is configured to, in a random access procedure, receive a random access response message from a network side device, and the random access response message comprises at least one Medium Access Control (MAC) data sub-header and a data message, wherein the processor is configured to read the program in the memory so as to obtain data related to the UE in accordance with the MAC data sub-header, and the MAC data sub-header is used to indicate: (i) the data message included in the random access response message; or (ii) a response message and the data message included in the random access response message,
wherein a T field of the MAC data sub-header is set to 1, a first R field of the MAC data sub-header is set to 1, a second R field of the MAC data sub-header is set to 1, and the response message indicating success response and the data message are attached to the MAC data sub-header immediately; and
the MAC data sub-header indicates that the subsequent response message includes the random access success response and the data message, a part of, or all of, last four bits in the MAC data sub-header are used to indicate a length of the data message.

20. The UE according to claim 19, wherein the MAC data sub-header has a first indication bit of a first predetermined value and a second indication bit of a second predetermined value, and the MAC data sub-header comprises a Backoff Indicator (BI).

* * * * *